United States Patent
Moran et al.

(10) Patent No.: US 8,848,537 B2
(45) Date of Patent: Sep. 30, 2014

(54) TOKEN BUCKET MANAGEMENT APPARATUS AND METHOD OF MANAGING A TOKEN BUCKET

(75) Inventors: Gil Moran, Meitar (IL); Mark Glazman, Beer-Sheva (IL); Adi Katz, Ramat Gan (IL)

(73) Assignee: Freescale Semiconductor, Inc., Austin, TX (US)

( * ) Notice: Subject to any disclaimer, the term of this patent is extended or adjusted under 35 U.S.C. 154(b) by 79 days.

(21) Appl. No.: 13/582,524

(22) PCT Filed: Mar. 22, 2010

(86) PCT No.: PCT/IB2010/051232
§ 371 (c)(1),
(2), (4) Date: Sep. 4, 2012

(87) PCT Pub. No.: WO2011/117672
PCT Pub. Date: Sep. 29, 2011

(65) Prior Publication Data
US 2013/0003555 A1    Jan. 3, 2013

(51) Int. Cl.
*H04L 12/26* (2006.01)
*H04L 12/851* (2013.01)
*H04L 12/801* (2013.01)
*H04L 12/819* (2013.01)
*H04L 12/70* (2013.01)

(52) U.S. Cl.
CPC ..... *H04L 47/2441* (2013.01); *H04L 2012/5637* (2013.01); *H04L 47/10* (2013.01); *H04L 47/215* (2013.01)
USPC ........................................ 370/235.1

(58) Field of Classification Search
USPC .............. 370/230–235.1, 252, 389, 370/395.5–395.52
See application file for complete search history.

(56) References Cited

U.S. PATENT DOCUMENTS

| 6,925,055 | B1 | 8/2005 | Erimli et al. |
| 7,529,191 | B2 | 5/2009 | Smith et al. |
| 7,577,096 | B2 | 8/2009 | Smith et al. |
| 2002/0138643 | A1 | 9/2002 | Shin et al. |
| 2003/0069970 | A1 | 4/2003 | Kim et al. |
| 2003/0107988 | A1* | 6/2003 | Lodha et al. ........ 370/229 |
| 2009/0086634 | A1 | 4/2009 | Kwan et al. |

FOREIGN PATENT DOCUMENTS

KR    10-0656348 B1    12/2006

OTHER PUBLICATIONS

International Search Report and Written Opinion correlating to PCT/IB2010/051232 dated Dec. 20, 2010.

* cited by examiner

*Primary Examiner* — Frank Duong

(57) ABSTRACT

A token bucket management apparatus comprises a processing resource having an input for receiving profile data associated with a classified data stream. The processing resource also comprises an arithmetic unit arranged to maintain a bucket status value for a token bucket associated with the classified data stream. The arithmetic unit is a fixed point arithmetic unit that is arranged to maintain the bucket status value in accordance with a fixed point representation of non-integer numbers having a first accuracy. The arithmetic unit calculates a fixed point non-integer increment value in accordance with a fixed point representation of non-integer numbers having a second accuracy. The arithmetic unit is arranged to manipulate the calculated non-integer increment value so as to bring the second accuracy into agreement with the first accuracy, and to increment the bucket status value by the manipulated non-integer increment value.

20 Claims, 2 Drawing Sheets

TOKEN BUCKET MANAGEMENT APPARATUS AND METHOD OF MANAGING A TOKEN BUCKET

FIELD OF THE INVENTION

This invention relates to a token bucket management apparatus of the type that, for example, comprises a token bucket relating for policing, metering or shaping in relation to a data flow. This invention also relates to a method of managing a token bucket, the method being of the type that, for example, monitors the size of a token bucket for policing, metering or shaping in relation to a data flow.

BACKGROUND OF THE INVENTION

In the field of data communications, it is known to communicate data from a source node to a destination node in accordance with a number of known communications protocols. In this respect, datagrams flow through one or more communications networks, for example the Internet, between the source and the destination nodes, in order to communicate information between the source and destination nodes.

Typically, communications networks support different types of services, some of which is delay tolerant and some of which are delay intolerant. Examples of delay intolerant services include: real-time streaming multimedia applications, such as Voice-over-Internet Protocol (VoIP) services, on-line gaming services or Internet Protocol (IP)-Television (IP-TV) services. Without proper prioritisation and shaping of traffic associated with these services, network congestion is likely to occur, because network capacity is typically a limited resource, and for some networks is insufficient, for example wireless communications networks, such as cellular communications networks.

Resource reservation control mechanisms are therefore implemented in order to maintain Quality of Services (QoS) guarantees for certain types of services supported by the communications network. In this regard, the mechanisms provide different priorities to different applications, users, and/or data flows. In respect of data flows, the mechanisms can support guarantees of certain levels of performance, for example in relation to a required bit rate, delay, jitter, packet-drop probability and/or Bit Error Rate (BER).

Consequently, in order to support the above-mentioned resource reservation mechanisms, network equipment, for example routers located throughout a network, are configured to support traffic shaping. Of course, in order to support uniformity of application of the resource reservation control mechanisms, a number of policies have been developed amongst equipment manufacturers and other interested parties in the Internet community in relation to handling of traffic according to profiles assigned to different types of flows of traffic, for example as specified in Request For Comments (RFC) 2697, RFC 2698, and RFC 4115.

For these and other policies, it is known to implement so-called "token buckets", which is, generally speaking, a control mechanism that determines when traffic can be transmitted. In this regard, a conceptual container or bucket that can hold tokens is implemented, the tokens representing a unit of bytes or a single packet. A correspondence therefore exists between a number of tokens and the transmission of a packet.

When sufficient tokens are present in the bucket, traffic relating to a flow of data can be transmitted, but when there are no or insufficient tokens in the bucket, traffic can not be transmitted. In this respect, when traffic is transmitted, the bucket is decremented in accordance with the amount of data transmitted. However, the bucket is also replenished at a constant rate until the bucket is full.

When implementing the token bucket, it is known to provide a common time base, a shared computation unit and shared data storage, for example a Random Access Memory (RAM). These shared resources are used to manage a very large number of separate data flows having respective profiles associated therewith. For each profile, one or more token buckets can be employed, depending upon whether the profile concerns support for a single or multiple data rates. Indeed, the shared resources are capable of supporting a wide range of traffic rates from less then a packet per second up to multi-Gigabit per second traffic by different representation of the common time base and the bucket status.

Consequently, a large number of token buckets need to be employed and it can be seen that the shared computation unit and shared RAM cannot update all buckets by at a constant rate in accordance with a classic token bucket algorithm. In this respect, when the RAM is large in order to store token bucket-related data for a large number of flows, an increment of one token every 1/R period is not feasible, because it is not possible to update every token bucket at every 1/R interval for each token bucket due to access time limitations of the RAM. In order to maintain accuracy, particularly in relation to high data rate flows, it is necessary to represent and store timestamp data, statuses of buckets and data rates as non-integer numbers, requiring the RAM to have a sufficiently large capacity in order to store, for example floating point values. When implemented in hardware, the large capacity requirement of the RAM translates into increased die space on an Integrated Circuit (IC), which attracts greater power consumption by the device as well as increased access times. In this regard, wide counters, for example 64 bit counters are typically required. Where floating point arithmetic is employed, which is the preferred type of arithmetic for embedded software that runs on integer cores, large and complex computation logic is required in order to perform calculations.

SUMMARY OF THE INVENTION

The present invention provides a token bucket management apparatus and a method of managing a token bucket as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In this regard, the following examples relate to management of a token bucket in a data switch 100 (FIG. 1) for policing, metering and/or shaping flows of data. However, the skilled person should appreciate that the examples described herein relating to token buckets can be applied more widely in relation to management of, for example, data flows in general and so references herein to the data switch 100 should simply be treated as one example implementation and other implementations are contemplated.

In the examples below, the data switch 100 will be described in the context of supporting a data flow management policy that can be in accordance with RFC 2697, RFC 2698, and/or RFC 4115. However, for the sake of simplicity and conciseness of description, and so as not to district from the essence of the embodiments, the detail of these RFCs will not be described herein. However, the skilled person should appreciate that these RFCs relate to data flow management using one or more token buckets. Furthermore, the parameters employed in relation to these RFCs include, for example, data rates such as a Committed Information Rate (CIR), an Excess Information Rate (EIR) and/or a Peak Information Rate (PIR). Similarly, the parameters of these RFCs include, for example, burst sizes, such as a Committed Burst Size (CBS), an Excess Burst Size (EBS) and/or a Peak Burst Size (PBS). In these RFCs, token buckets are assigned for each type of burst for the purposes of metering and marking of traffic. However, for the purposes of describing management of a token bucket herein, it is sufficient to refer to a burst size, BS, and a rate, R in general.

Furthermore, it will be appreciated that operation of a token bucket involves the increment and decrement of the token bucket. For a given data flow, the token bucket is decremented in accordance with the amount of data received in relation to the given flow, subject to rules relating to resources, for example as defined in the above-mentioned RFCs. Also, for the given flow, the token bucket is incremented in accordance with a predetermined fill rate, R, associated with resources allocated to the given flow. The following examples concern the incrementing aspect of the operation of the token bucket.

Figure 1:
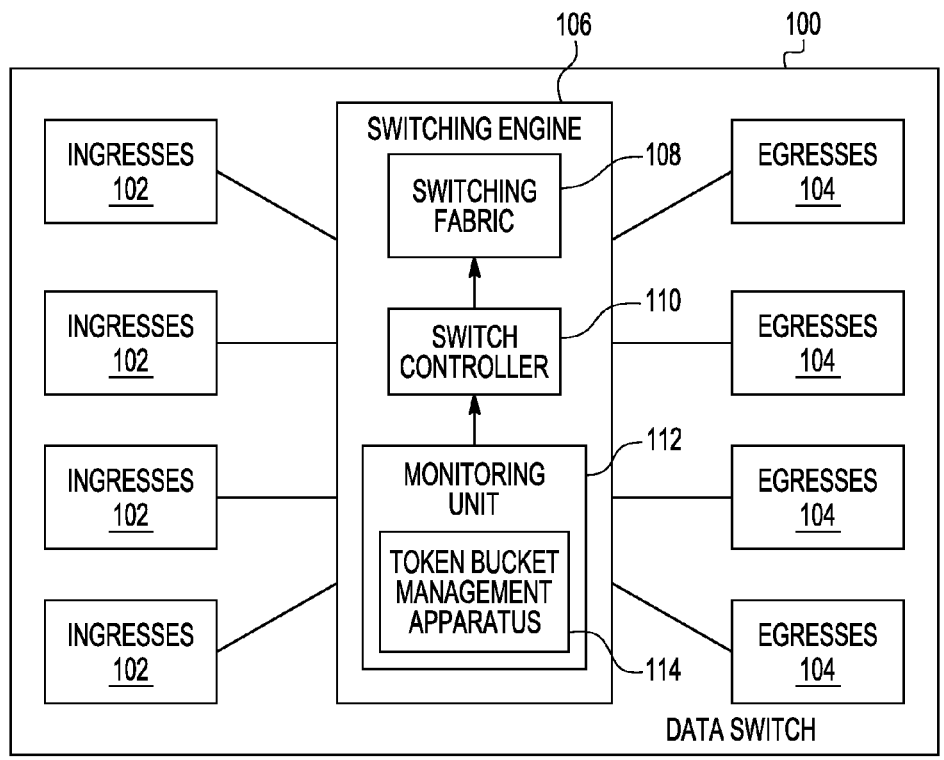
FIG. 1 schematically shows an example of a data switch constituting an embodiment of the invention.

Turning to FIG. 1, the data switch 100 comprises a plurality of ingresses 102 and a plurality of egresses 104. The ingresses and the egresses 102, 104 are coupled to a switching engine 106. The switching engine 106 comprises a switching fabric 108 coupled to a switch controller 110, the switch controller 110 being coupled to monitoring unit 112 of the switching engine 106 comprising a token bucket management apparatus 114. The monitoring unit 112 provides information concerning adherence to traffic management policies associated with receipt of datagrams, for example packets, the ingress traffic being analysed by a classification process that assigns the received packet to a traffic flow as will be described later below. In this regard, the data switch 100 typically handles a plurality of data flows, which have respective policies relating thereto. The information concerning adherence to traffic management policies is communicated to the switch controller 110 for use in implementing the policies concerning flows of packets through the data switch 100. As the use of the information concerning adherence to the traffic management policies is not central to the embodiments described herein, in order not to district from the essence of the embodiments herein, the detail concerning the switch controller 110 and the switching fabric 108 and operation thereof will not be described in further detail.

Figure 2:
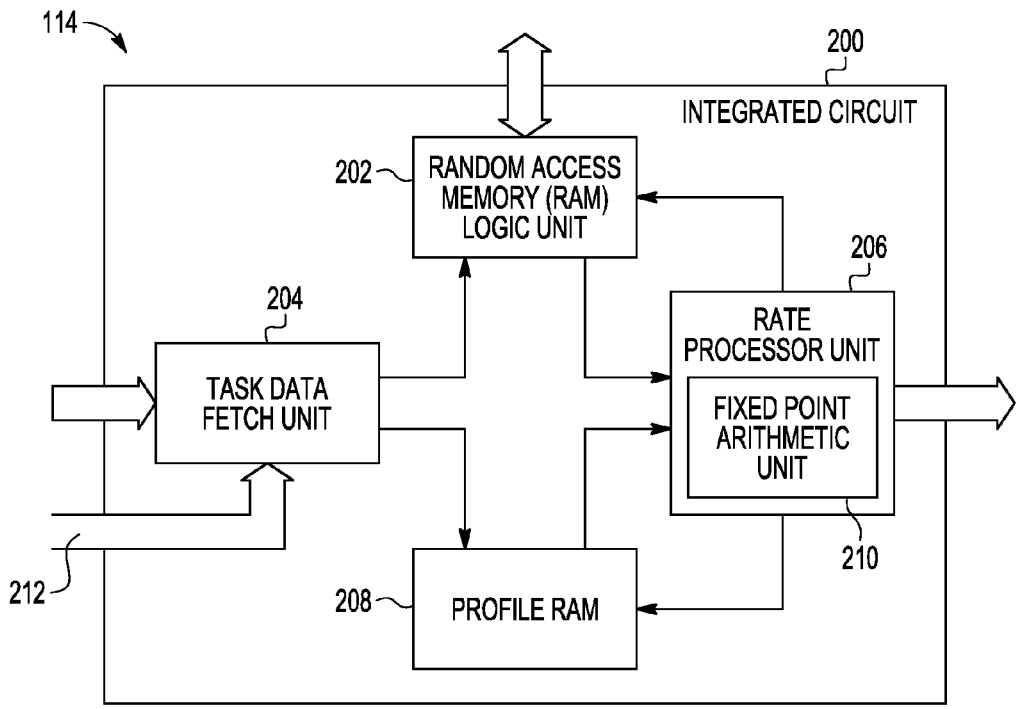
FIG. 2 is a schematic diagram of a token bucket management apparatus of FIG. 1.

Referring to FIG. 2, the token bucket management apparatus 114 is supported by hardware, for example an integrated circuit 200, providing a Random Access Memory (RAM) logic unit 202 coupled to task data fetch unit 204 and a processing resource, for example a rate processor unit 206. The RAM logic unit 202 comprises stored data concerning the types of packet that the data switch receives, for example total packet length, offsets of packet headers for calculating specific partial datagram lengths, such as so-called L2, L3 and L4 payloads. The task data fetch unit 204 and the rate processor 206 are coupled to a profile RAM 208. The profile RAM 208 comprises constants and variables relating to profiles of flows. The width of the profile RAM 208, in this example, is 32 bits. However, any other suitable width may be employed, depending upon the application of the token bucket. The depth of the profile RAM 208 depends upon the number of profiles that the profile RAM 208 is required to store. The rate processor unit 206 is coupled to a scheduler (not shown) and also comprises a fixed point arithmetic unit 210 and temporary registers (not shown).

In operation, a packet is received at one of the ingresses 102. In response to receipt of the packet, the task data fetch unit 204 interacts with the RAM access logic 202 in order to initiate parsing of the received packet, the RAM access logic 202 accessing a main memory (not shown) of the data switch 100 in order to obtain frame information in order to determine a traffic profile associated with the received packet.

The task data fetch unit 204 is provided with current timestamp data 212, in this example 32 bit timestamp data, which is "pushed" to the rate processor unit 206. In order to optimise computational accuracy across all rates of traffic, the rate of the timestamp bus (not shown) is configured to count significantly faster, for example at a rate of 200 MHz, than the maximum packet rate expected to be handled by the data switch 100. A thread, executed elsewhere in a pre-fetch unit (not shown) supported by the circuit 200, pre-fetches the received packet data from the main memory while another substantially parallel thread performs the identification of the traffic profile associated with the received packet. In this respect, for each profile to which the data switch 100 is required to recognise, the profile RAM 208 stores associated profile data. The associated profile data stored includes constants, for example a burst size, BS, and a rate, R. Each constant is allocated, in this example, a 32-bit wide space in the profile memory 208. Also, a bucket status, $B_{status}$, variable corresponding to the fill status of the token bucket is recorded in the profile RAM 208, along with other variables, for example a preceding or last timestamp value, $TS_{t-1}$.

Once the received packet data has been fetched and the profile identified, the received packet data and the profile data are "pushed" to the rate processor unit 206 when it is ready. The rate processor unit 206, when ready, receives the burst size, BS, a rate, R, the last timestamp value, $TS_{t-1}$, and bucket status, $B_{status}$. The current timestamp value, $TS_t$ is pushed to the rate processor unit 206 as already describe above. This data is then used by the fixed point arithmetic unit 210 of the rate processor 206 as follows in order to maintain one or more token bucket statuses.

Figure 3:
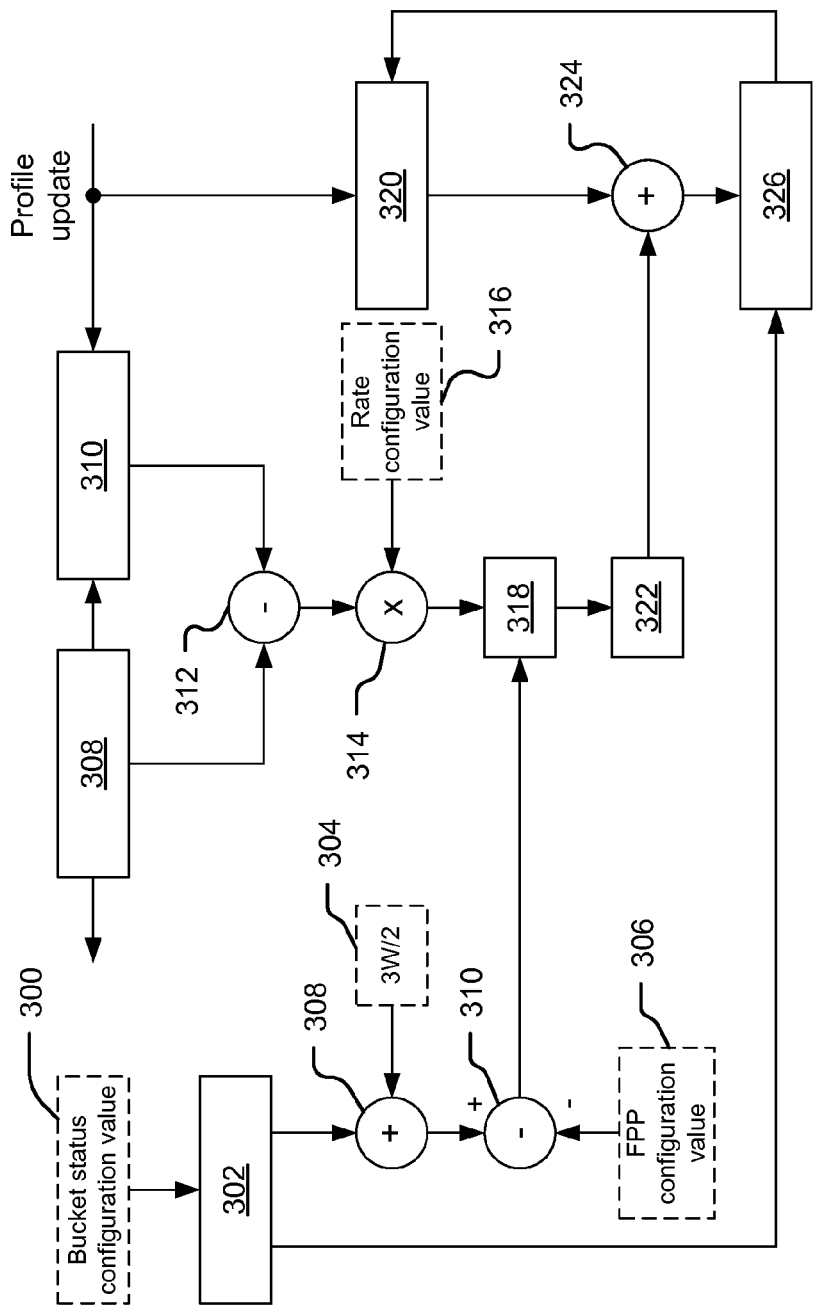
FIG. 3 is a pseudo-flow diagram of a method of managing a token bucket used by the token bucket management apparatus of FIG. 2 and constituting another embodiment of the invention.

Turning to FIG. 3, using the burst size, BS, the fixed point arithmetic unit 210 supports a bit manipulator that manipulates W bits, in this example 32 bits, comprising the burst size, BS, 300 by left shifting (Step 302) the 32 bit word until leading zeros in the word are removed, i.e. a first bit of the burst size value, BS, is a Most Significant Bit (MSB) of the burst size word. The fixed point arithmetic unit 210, as its name suggests, performs operations on data using fixed point representation of non-integer numbers, i.e. a portion of the word comprises an integer portion and another portion of the word comprises a fraction portion. Consequently, the bit shifted burst size value, BS, is represented in this way and comprises a fraction portion of width BSFPP bits and an integer portion of width W-BSFPP. This representation is recorded to serve as a fixed point representation template for subsequent masking to be described later herein. Similarly, the bucket status, $B_{status}$, is expressed in accordance with a fixed point representation of non-integer numbers and, in this example, has a first degree of accuracy associated therewith.

The width, BSFPP, of the fraction portion of the burst size, BS, is used by the bit manipulator in conjunction with a predetermined width, FPP, 306 to be allocated to the fraction portion of timestamp data, $TS_{t-1}$, $TS_t$, and a predetermined multiplication compensation constant or factor of 3W/2 304 in order to calculate an accuracy conversion value used for left bit shifting of bits as will be described later herein. The multiplication compensation constant or factor corresponds to a width of rate data, R, and an additional allowance of, in this example W bits, for storing the result of a multiplication constituting a fixed point increment value for the token bucket. In order to calculate the accuracy conversion value, the width of the burst size value, BS, which takes into account the bit-shift operation performed in relation to the burst size value, BS, is added to the predetermined multiplication compensation constant 3W/2 by a summation unit 308 supported by the fixed point arithmetic unit 210. The summation unit 308 has a first input for receiving the width of the burst size value, BS, and a second input for receiving the predetermined multiplication compensation constant 3W/2, which is stored locally in the rate processor 206. An output of the summation unit 308 is provided to a first input of a subtraction unit 310 that is also supported by the fixed point arithmetic unit 210. A second input of the subtraction unit 310 is arranged to receive the predetermined width, FPP, 306 and to subtract the predetermined width, FPP, 306 from the value provided at the output of the summation unit 308. An output of the subtraction unit 310 provides a value constituting the accuracy conversion value.

The accuracy conversion value is used in relation to managing the token bucket as will now be described.

As mentioned above, the current timestamp value, $TS_t$, 308 and the preceding timestamp value, $TS_{t-1}$, 310 are provided to the rate processor 206 and the difference between the two timestamp values is calculated by another subtraction unit 312 supported by the fixed point arithmetic unit 210. As mentioned above, the width of the fraction portions of the timestamp data, $TS_{t-1}$, $TS_t$, is FPP bits wide. As the timestamp data, $TS_{t-1}$, $TS_t$, are each allocated a word for recordal and manipulation thereof, the width of the integer portion of each of the timestamp data, $TS_{t-1}$, $TS_t$, is W-FPP bits. The calculated difference between the two timestamp values, $T_{diff}$, is known as a component of the calculation of the increment value for the token bucket.

In order to calculate the increment value, the fixed point arithmetic unit 210 supports a multiplication unit 314 of width 2W that receives the calculated difference between the two timestamp values, $T_{diff}$, and the rate, R, 316, represented as W/2 integer bits and W/2 fraction bits, and multiplies these values in order to provide, at the output of the multiplication unit 314, the increment value. In this example, due to the use of fixed point arithmetic, the increment value is a fixed point increment value and has a second degree of accuracy associated therewith. The second degree of accuracy is different to the first degree of accuracy due to the use of different fixed point positions in respect of the fixed point increment value and the bucket status, $B_{status}$. In order to support the multiplication function, and as suggested above, the temporary register of the rate processor 206 used to store the result of the multiplication is 2W wide, in this example a longword 64 bits wide. The fraction portion of the fixed point increment value is W/2+FPP bits wide, and since the temporary register is 2W bits wide, the integer portion of the fixed point increment value is 3W/2-FPP bits wide.

Thereafter, the fixed point arithmetic unit 210 supports a data manipulation unit of the bit manipulator, in this example a left bit shifter 318 in order to bring the second degree of accuracy into agreement or into registry with the first degree of accuracy. The left bit shifter 318 uses the accuracy conversion value calculated, and as described above, in order to shift the bits of the fixed point increment value to the left by a number of bit positions corresponding to the accuracy conversion value, the result of the shifting operation being 3W bits wide, in this example, 96 bits wide. Following the shift operation, the fraction portion of the manipulated fixed point increment value is 2W+BSFPP bits wide, because the bits of the fixed point increment value have been shifted to the left by 3W/2+BSFPP-FPP bits. Since the temporary register is 3W bits wide, the integer portion of the manipulated fixed point increment value is W-BSFPP bits wide. Additionally, non-zero bits exceeding the width of the integer portion can remain in the 3W wide structure. However, these additional bits are treated as overflow bits and are subsequently truncated as will be described later herein.

By virtue of the left shift operation, the integer portion of the fixed point increment value is aligned or in registry with the integer portion of the bucket status, $B_{status}$, 320. However, the width of the bit pattern representing the manipulated fixed point increment value is much longer than the predetermined width, W, allocated for representation of the bucket status, $B_{status}$, 320. Consequently, the fixed point arithmetic unit 210 supports a bit extractor 322 that isolates or extracts the W MSBs of the manipulated fixed point increment value so that the width of the manipulated fixed point increment value is consistent with, i.e. the same as, the width allocated for representation of the bucket status, $B_{status}$, thereby making the manipulated fixed point increment value compatible with the bucket status, $B_{status}$, for performing addition. It should be noted that, in this example, logic of the left bit shifter 318 can detect overflows and in order to account for such overflows, the left bit shifter 318 can, in place of extracting the bits, provide W bits that are the same value as the burst size value, BS. Of course, other suitably large values greater than the burst size value, BS, can be employed, for example the bits provided by the left bit shifter 318 can be all 1's.

The fixed point arithmetic unit 210 supports another summation unit 324, which receives at a first input thereof the bucket status, $B_{status}$, value 320 retrieved as mentioned above and at a second input thereof the extracted bits from the manipulated fixed point increment value. The summation unit 324 thus provides an updated bucket status value, which may be W+1 bits wide in the event of the addition operation causing the burst size value, BS, to be exceeded. Consequently, the fixed point representation template relating to the burst size, BS (calculated as mentioned above), is used by a compare and truncate unit 326 supported by the fixed point arithmetic unit 210 in order to limit the value of the bucket status, $B_{status}$, to the burst size, BS, in accordance with the fixed point representation of the burst size, BS, and also in accordance with the operational constraint associated with the token bucket, namely that the bucket status value, $B_{status}$, should not exceed the burst size value, BS. Once the updated bucket status value has been calculated, the rate processor 206 stores the updated bucket status value in the profile memory 208 in respect of the profile to which the received packet relates. The current timestamp, $TS_t$, is also recorded in the profile data in place of the preceding timestamp, $TS_{t-1}$. The above process is repeated in response to receipt of subsequent packets. As can be seen, depending upon the profile to which a given received packet relates, the rate processor 206 processes different data relating to different profiles and hence different token buckets. Furthermore, the above example uses the width of data bits required to represent the bucket status, $B_{status}$, in order to adopt a fixed point representation of non-integer numbers that maximises the number of bits used to represent fractions in calculations.

In another embodiment, the rate processor 206 supports a refresh packet generator (not shown), implemented in the task data fetch unit 204, that generates a virtual packet of size zero, hereafter referred to as a "refresh packet". The rate processor 206 does not decrement the token bucket in response to the refresh packet, because the size of the refresh packet is zero. Additionally, the refresh packet is marked so that other profile-related variables, for example statistic counters, are not updated. The refresh packet generator monitors the current timestamp data $TS_t$, in particular a number of MSBs of the current timestamp data, $TS_t$, corresponding to the number of profiles to be managed, in order to detect a change of state of one or more of the number of MSBs of the current timestamp data, $TS_t$. In this regard, different combinations of MSBs are monitored in relation to different respective profiles. In one example, the leftmost MSB is not monitored so that a refresh packet is triggered twice in a wrap-around period of the timestamp data for an associated profile.

Upon detection of a change of state, for example a toggle, the refresh packet generator generates a refresh datagram that is detected by the task data fetch unit 204, triggering an attempt to increment the token bucket in the manner described above in relation to the previous embodiment. However, as mentioned above, the bucket status, $B_{status}$, is not decremented as the refresh packet is an empty packet. Hence, the effects of rollover of the timestamp data are mitigated.

It is thus possible to provide a token bucket management apparatus and a method of managing a token bucket that reduces memory space required to support a token bucket, without an associated loss of accuracy. The use of fixed point representation of non-integer numbers also facilitates the use of simplified logic circuitry to mange the token bucket. Additionally, the width of the data representation format used in relation to calculations to maintain the token bucket is narrower than the width of known data representation formats for other hardware implementations of the token bucket. Consequently, access times are reduced and die space occupied by the memory is thereby also reduced resulting in a reduced bill of materials in relation to the token bucket implemented in an integrated circuit. Additionally, the contribution of the apparatus to power consumption by an integrated circuit comprising the apparatus is reduced. Furthermore, the use of refresh datagrams obviates or at least mitigates so-called timestamp rollover and so obviates or at least mitigates calculation errors caused by timestamp rollover in respect of datagrams traversing at low data rates.

Of course, the above advantages are exemplary, and these or other advantages may be achieved by the invention. Further, the skilled person will appreciate that not all advantages stated above are necessarily achieved by embodiments described herein.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the control unit 110 and the monitoring unit 112 may be combined as a single functional unit.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the rate processor 206 supports processing in relation to multiple profiles. Alternatively, the examples may be implemented as any number of separate integrated circuits or separate devices interconnected with each other in a suitable manner. For example, processing in relation to different groups of profiles may be allocated to respective different integrated circuits.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, for example a Field Programmable Gate Array (FPGA).

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A token bucket management apparatus comprising:
a processing resource comprising
an input for receiving profile data associated with a classified data stream, and
an arithmetic unit arranged to maintain a bucket status value for a token bucket associated with the classified data stream, wherein
the arithmetic unit is a fixed point arithmetic unit that is further arranged to maintain the bucket status value in accordance with a fixed point representation of non-integer numbers having a first degree of accuracy,
calculate a fixed point non-integer increment value in accordance with a fixed point representation of non-integer numbers having a second degree of accuracy,
manipulate the calculated fixed point non-integer increment value so as to bring the second degree of accuracy into agreement with the first degree of accuracy, and
increment the bucket status value by the manipulated fixed point non-integer increment value.

2. An apparatus as claimed in claim 1, wherein the first degree of accuracy is different to the second degree of accuracy.

3. An apparatus as claimed in claim 1, wherein the fixed point non-integer increment value is calculated in accordance with a predetermined increment rate.

4. An apparatus as claimed in claim 1, further comprising a memory, operably coupled to the processing resource, for storing and providing the profile data.

5. An apparatus as claimed in claim 1, wherein the fixed point arithmetic unit is arranged to manipulate the calculated fixed point non-integer increment value by performing a bit shift operation.

6. An apparatus as claimed in claim 1, wherein the fixed point arithmetic unit supports a bit manipulator, the bit manipulator being arranged to manipulate the calculated fixed point non-integer increment value.

7. An apparatus as claimed in claim 6, wherein the bit manipulator is arranged to calculate an accuracy conversion value constituting a parameter associated with manipulation of the calculated fixed point non-integer increment value.

8. An apparatus as claimed in claim 7, wherein the bit manipulator is arranged to calculate the accuracy conversion value using a first width value associated with an integer part of a predetermined burst size value, a second width value associated with an integer part of a predetermined fixed point configuration value relating to time measurement, and a multiplication compensation factor.

9. An apparatus as claimed in claim 8, wherein the multiplication compensation factor corresponds to a width of rate data and an allowance for an additional data storage width for storing the fixed point non-integer increment value.

10. An apparatus as claimed in claim 8, wherein the bit manipulator comprises a summation unit having a first input, a second input and an output, the output being coupled to a first input of a subtraction unit.

11. An apparatus as claimed in claim 10, wherein the first input of the summation unit is arranged to receive the first width value associated with the integer part of the predetermined burst size value, the second input of the summation unit is arranged to receive the multiplication compensation factor, and a second input of the subtraction unit is arranged to receive the second width value associated with the integer part of the predetermined fixed point configuration value relating to time measurement.

12. An apparatus as claimed in claim 11, wherein the subtraction unit is arranged to subtract the second width value associated with the integer part of the predetermined fixed point configuration value relating to time measurement from a value provided by the output of the summation unit.

13. An apparatus as claimed in claim 7, wherein the bit manipulator comprises a bit shifter arranged to left shift the calculated fixed point non-integer increment value by the accuracy conversion value.

14. An apparatus as claimed in claim 13, further comprising a bit extractor arranged to isolate W Most Significant Bits (MSBs) from an output of the bit shifter, where W is a predetermined reserved memory width.

15. An apparatus as claimed in claim 14, further comprising a bit mask arranged to compare extracted Most Significant Bits with a bucket status fixed point representation template and to truncate the extracted Most Significant Bits so as to conform with the bucket status fixed point representation template.

16. An apparatus as claimed in claim 1, further comprising a datagram generator arranged to generate a refresh datagram, the processing resource being arranged to store timestamp data in response to receipt thereof.

17. An apparatus as claimed in claim 16, wherein the processing resource is arranged to monitor a number of Most Significant Bits of the timestamp data and to generate the refresh datagram in response to detection of a change of state of a bit of the number of Most Significant Bits of the timestamp data.

18. A data switch comprising the token bucket management apparatus as claimed claim 1.

19. An integrated circuit for token bucket management comprising:
   a rate processor unit comprising an input for receiving profile data associated with a classified data stream, and
   an arithmetic unit arranged to maintain a bucket status value for a token bucket associated with the classified data stream wherein
      the arithmetic unit is a fixed point arithmetic unit that is further arranged to maintain the bucket status value in accordance with a fixed point representation of non-integer numbers having a first degree of accuracy, and to
         calculate a fixed point non-integer increment value in accordance with a fixed point representation of non-integer numbers having a second degree of accuracy,
         manipulate the calculated fixed point non-integer increment value so as to bring the second degree of accuracy into agreement with the first degree of accuracy, and
         increment the bucket status value by the manipulated fixed point non-integer increment value.

20. A method of token bucket management, the method comprising:
   receiving by an arithmetic unit of a computing device profile data associated with a classified data stream;
   maintaining by the arithmetic unit a bucket status value for a token bucket associated with the classified data stream; wherein
   the bucket status value is maintained in accordance with a fixed point representation of non-integer numbers having a first degree of accuracy; and further comprising:
   calculating by the arithmetic unit a fixed point non-integer increment value in accordance with a fixed point representation of non-integer numbers having a second degree of accuracy;
   manipulating by the arithmetic unit the calculated fixed point non-integer increment value so as to bring the second degree of accuracy into agreement with the first degree of accuracy; and
   incrementing by the arithmetic unit the bucket status value by the manipulated fixed point non-integer increment value.

\* \* \* \* \*